*INVENTOR.*
SEAMUS GEAROID TIMONEY

BY *Kurt Kelman*

AGENT

United States Patent Office 3,270,730
Patented Sept. 6, 1966

3,270,730
INTERNAL COMBUSTION ENGINES
Seamus Gearoid Timoney, 9 Hume St., Dublin, Ireland
Filed Nov. 3, 1964, Ser. No. 408,617
Claims priority, application Great Britain, Nov. 14, 1963,
45,025/63
7 Claims. (Cl. 123—119)

This invention relates to internal combustion engines of the type in which the compression ratio may be varied and in which the engine charge air is supplied wholly or partially by one or more air pumps driven directly or indirectly from the engine power shaft, it being understood that the expression "engine charge air" is intended to include the charge air to each of the cylinders of a multi-cylinder engine.

The invention has for its object to provide an internal combustion engine of the type stated, in which high torque output is achieved at low engine speed while peak cycle cylinder pressure is limited to the normal value usually encountered with low torque engines.

With this object in view, the invention comprises an internal combustion engine of the type stated having in combination an engine cylinder charging air pump driven directly or indirectly from the engine power shaft through variable speed drive means permitting controllable alteration of the speed of the air pump while output power is being delivered by the engine, and means complementary thereto for automatic variation of the compression ratio of the engine cylinder. Obviously more than one air pump may be provided, and it will be understood that the expression "engine cylinder" includes each of the cylinders of a multi-cylinder engine.

Thus, the engine charge air delivery is controllable in accordance with the load requirements by controlling the speed ratio between the engine power shaft and the driven shaft of the air pump, and such speed ratio control may be manually or automatically responsive to the engine speed or load, air delivery pressure, or other similar functional characteristic hereinafter referred to collectively as controlling parameters. At the same time the compression ratio is controllable automatically in response to load conditions and/or the cylinder pressure.

The invention will be more clearly understood from the following description of alternative embodiments thereof given by way of example only with reference to the accompanying drawings in which.

Figure 1:
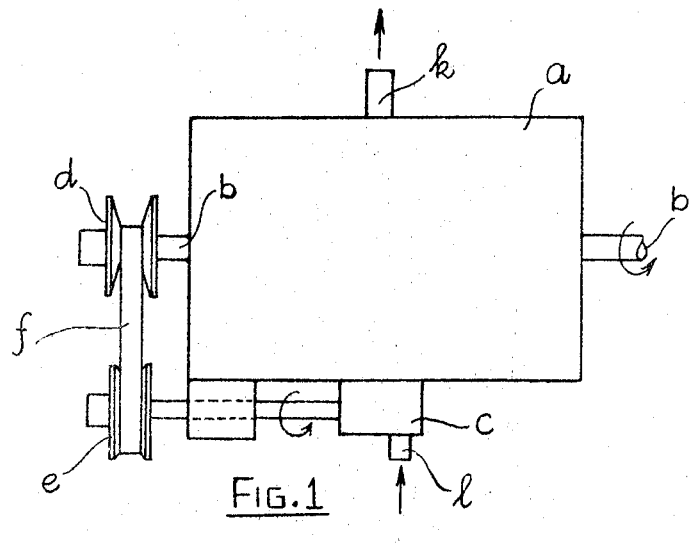
FIG. 1 is a diagrammatic view of an engine in accordance with the invention.

Referring to FIG. 1 of the drawings, a piston type of internal combustion engine $a$ having its exhaust at $k$ is charged with air from a charging air pump $c$ supplied with air at $l$ and driven from the engine power shaft $b$ through a variable speed drive unit of any suitable known type, such as the variable diameter V-belt drive illustrated consisting of a variable diameter V-type pulley $d$ secured to the engine power shaft $b$ and a variable diameter V-type pulley $e$ secured to the shaft of the air pump $c$, a V-belt $f$ running on the pulleys $d$ and $e$. If desired more than one pair of pulleys may be provided arranged in series or in parallel with a V-belt running on each pair, and the pulleys $d$ and $e$ may be driven indirectly through intermediate drives from the engine power shaft $b$ and air pump shaft respectively.

As is well known, the variation in diameter of the pulleys and consequent variation in speed ratio is attained by moving the two cheeks of one or the other or both of the pulleys $d$ or $e$ towards or away from each other, and such movement can conveniently be effected automatically in any one of several known ways responsive to one or more of the controlling parameters.

Obviously the control of the speed ratio between the engine power shaft $b$ and the shaft of the air pump $c$ may be manual or automatic. The automatic control responsive to one or more of the controlling parameters may be mechanical, electric or hydraulic, or may include combinations of these systems.

In order that excessive peak cycle cylinder pressures will not be encountered at high torque engine output, the engine according to the invention is provided with means for automatic variation of the compression ratio of the engine cylinder, the variable compression ratio means being complementary to the variable speed ratio means in effecting automatically reduction of engine cylinder compression ratio in response to increased air charge delivery from the air pump for high torque engine output.

Any of the hitherto known variable compression ratio mechanisms may be employed for this purpose, such as those described in British patent specifications Nos. 278,339, 675,984, 752,895, or 762,074.

If desired the charge from the air pump may be supplemented by providing a second air pump driven from the engine power shaft, or driven independently, in series or in parallel with the first air pump. Alternatively, a supplementary exhaust driven turbocharger may be employed, or combinations of such supplementary means may be adopted.

Figure 2:
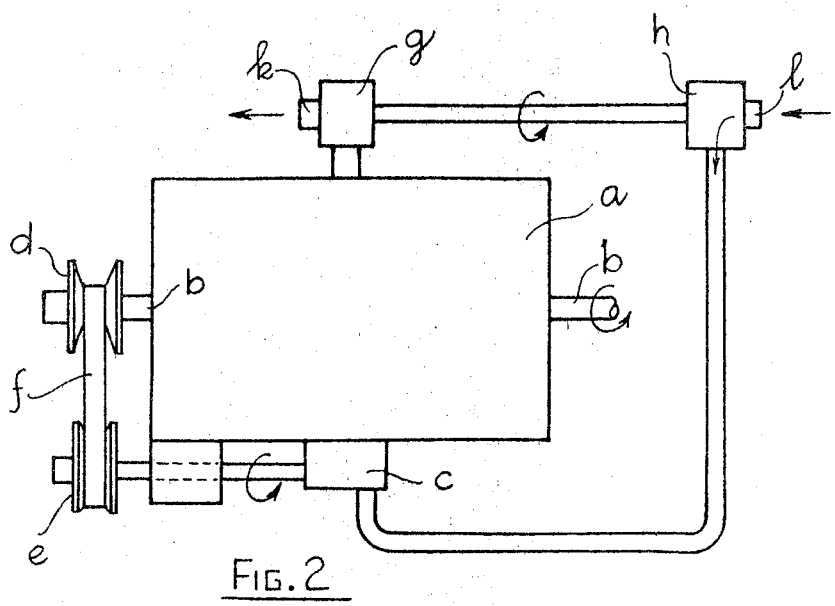
FIG. 2 is a diagrammatic view of a modification.

One arrangement of such supplementary combination means is illustrated in FIG. 2 in which an exhaust gas turbine $g$ drives a second air charging pump $h$ arranged in series with the first air pump $c$. The engine exhaust discharges at $k$ and air is admitted to the second pump $h$ at $l$.

Figure 3:
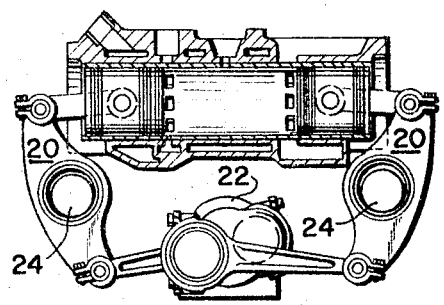
FIG. 3 illustrates one possible structure for automatically providing control of the compression ratio.

Referring to FIG. 3, there is shown therein a two-stroke engine having a pair of opposed pistons slidable in a common cylinder and reciprocated from a pair of rockers 20 which are in turn driven from a rotary crank shaft 22. The rockers 20 are mounted for pivotal movement on pivot shafts 24, and these pivot shafts are situated on eccentrics so that by turning these eccentrics it is possible to change the compression ratio.

Figure 4:
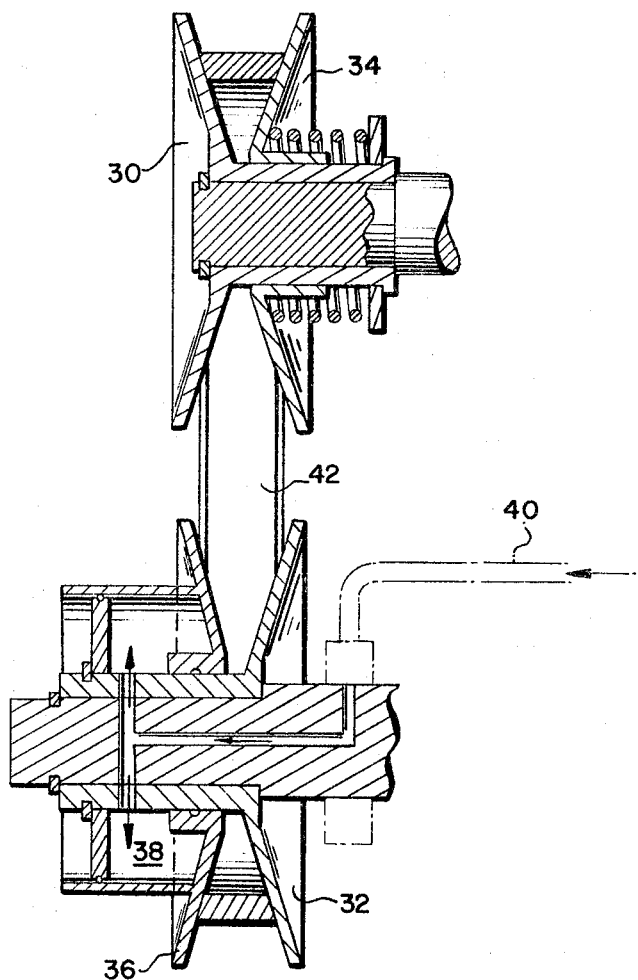
FIG. 4 is a partly schematic sectional illustration of the details of a structure for providing an adjustable V-belt drive.

Referring now to FIG. 4, the adjustable V-belt drive illustrated therein includes the fixed pulley cheeks 30 and 32 which respectively cooperate with the movable pulley cheeks 34 and 36. The cheek 36 is moved in response to flow of oil into and out of the chamber 38 which communicates through suitable passages with a conduit 40 from which the oil is derived. In response to movement of the cheek 36 the belt 42 will be displaced so as to provide automatic movement of the cheek 34 which is urged by a spring to the left, as viewed in FIG. 4.

Figure 5:
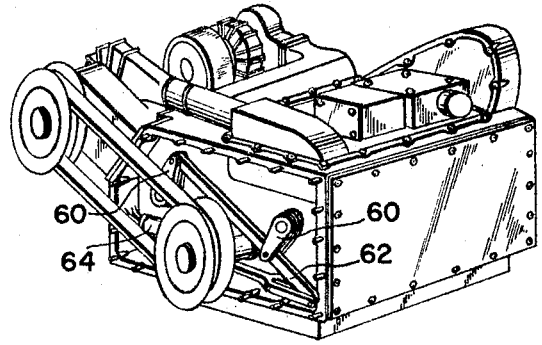
FIG. 5 is a simplified perspective illustration of an engine provided with structure for adjusting the V-belt drive and the compression ratio.

Referring now to FIG. 5, the engine illustrated therein, which is the same engine as is shown schematically in FIGS. 1 and 2, has a pair of control levers 60 which are connected with the eccentric shafts which support the pivots 24 on which the rockers 20 are turnable. These levers 60 are pivotally connected with an elongated tie bar 62 which is in turn linked to the piston of a hydraulic actuator 64. This hydraulic actuator 64 is connected with the conduit 40 of FIG. 4, so that complementary to any change in the transmission of FIG. 4 the hydraulic actuator 64 will act on the tie bar 62 so as to turn the levers 60 and thus adjust the eccentrics of FIG. 3 to change the compression ratio automatically. Conduit 40 communicates with the engine lubricating oil system to derive its pressure therefrom.

What I claim is:

1. An internal combustion engine comprising in combination, an engine power shaft driven by the engine cylinder air charging means driven from the engine power shaft through a variable speed drive unit permitting controllable alteration of the speed of the air charging means while output power is being delivered by the engine, and means for automatic variation of the engine cylinder compression ratio in response to the engine load condition or the engine cylinder pressure, or both.

2. An internal combustion engine as claimed in claim 1, in which the engine cylinder air charging means comprises an air pump having a driven shaft.

3. An internal combustion engine as claimed in claim 2, comprising air pump speed controlling means responsive to the engine speed.

4. An internal combustion engine as claimed in claim 2, comprising air pump speed controlling means responsive to the engine load.

5. An internal combustion engine as claimed in claim 2, comprising air pump speed controlling means responsive to the air delivery pressure.

6. An internal combustion engine as claimed in claim 2, in which the variable speed drive unit comprises a V-belt drive between a pair of variable diameter V-pulleys secured to the engine power shaft and the air pump driven shaft.

7. An internal combustion engine as claimed in claim 2, in which the air pump is connected in series with a second air pump actuated by a gas turbine driven by the exhaust from the engine.

References Cited by the Examiner

UNITED STATES PATENTS

| | | | |
|---|---|---|---|
| 1,645,178 | 10/1927 | Hall-Brown | 123—119 |
| 1,754,410 | 4/1930 | Allwill | 123—48 |
| 1,812,572 | 6/1931 | Talbot | 123—48 |
| 2,297,235 | 9/1942 | Mueller | 60—13 |
| 2,500,234 | 3/1950 | Bates | 60—13 |
| 3,003,307 | 10/1961 | Klaue | 60—13 |

MARK NEWMAN, *Primary Examiner.*

KARL J. ALBRECHT, *Examiner.*

A. L. SMITH, *Assistant Examiner.*